Nov. 16, 1943.   O. C. TALBOT   2,334,655
ROTARY INTERNAL COMBUSTION ENGINE
Filed Jan. 14, 1942   5 Sheets-Sheet 1

Inventor
Oliver C. Talbot.
Thorpe & Thorpe Attorneys

Nov. 16, 1943.   O. C. TALBOT   2,334,655
ROTARY INTERNAL COMBUSTION ENGINE
Filed Jan. 14, 1942   5 Sheets-Sheet 3

Inventor
Oliver C. Talbot
By
Thorpe & Thorpe
Attorneys

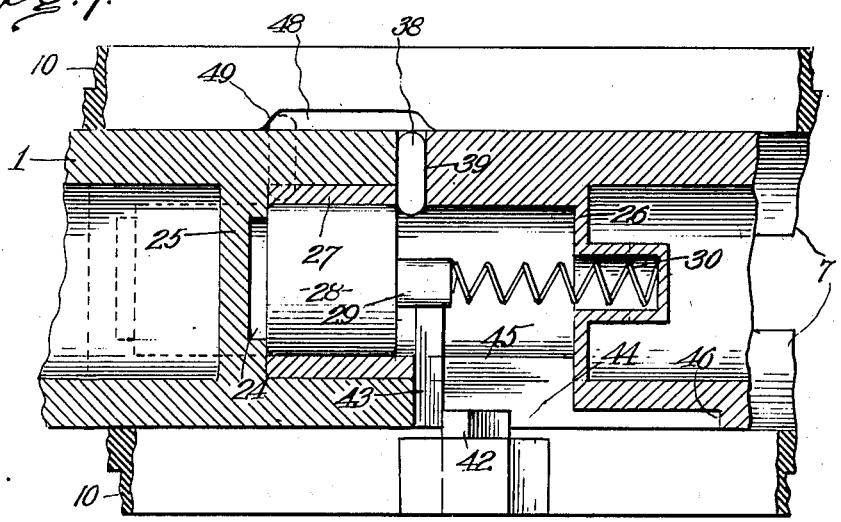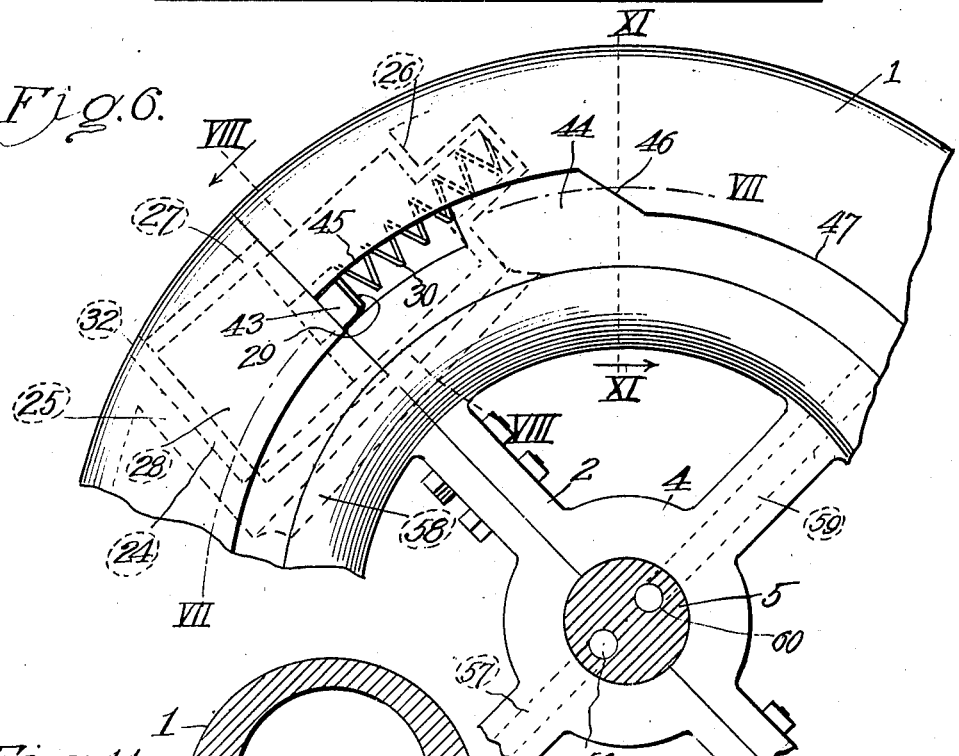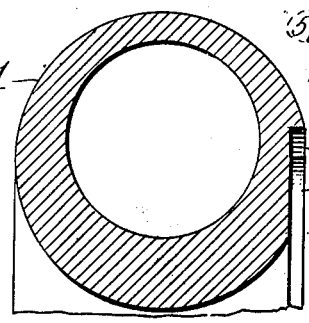

Nov. 16, 1943.  O. C. TALBOT  2,334,655
ROTARY INTERNAL COMBUSTION ENGINE
Filed Jan. 14, 1942   5 Sheets-Sheet 5
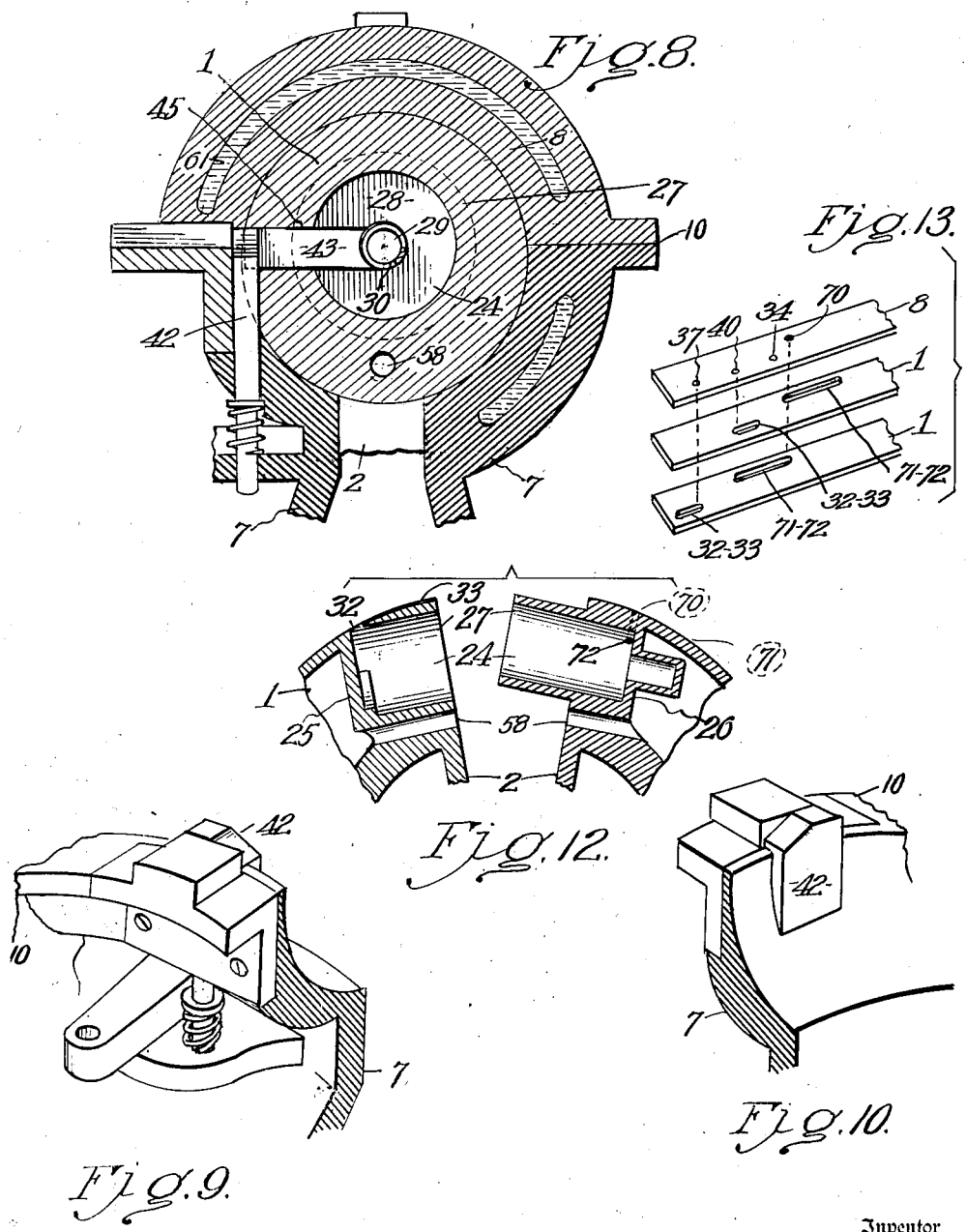
Inventor
Oliver C. Talbot
By Thorpe & Thorpe
Attorneys Patented Nov. 16, 1943

2,334,655

UNITED STATES PATENT OFFICE 2,334,655

ROTARY INTERNAL COMBUSTION ENGINE

Oliver Coe Talbot, Kansas City, Mo., assignor of one-half to Joseph M. Nolan, Kansas City, Mo.

Application January 14, 1942, Serial No. 426,684

8 Claims. (Cl. 123—43)

This invention relates to rotary internal combustion engines, and has for its general object to produce an engine of this kind in which the explosive charge is compressed by external means within an explosion chamber formed within a rotor between a partition therein and a reciprocatory or floating piston within and always movable with, and at times also having separate movement within, the explosion chamber, to permit expansion of the gases and for the purpose of scavenging said gases after each firing stroke.

Another object of the invention is to produce a construction of the type mentioned in which the engine is provided with means for the liquid cooling both of the fixed and revolving or operating parts of the engine, thereby assisting to overcome the lubrication problems usually encountered in this general type of engine.

A still further object of the invention is to produce an engine of strong, durable, simple and inexpensive construction; and in order that it may be fully understood, reference is to be had to the accompanying drawings, in which:

Figure 6 is an enlarged fragmentary side view of the rotor.

Figure 7 is an enlarged section concentrically of the rotor axis, on the line VII—VII of Figure 6, (but as though stretched in a straight line), to more clearly disclose part of the rotor and a reciprocatory piston therein and certain parts for cooperation with the rotor, piston and rotor casing.

Figure 8 is an enlarged section taken on the line VIII—VIII of Figure 6, but showing parts of the casing and other parts not appearing in Figure 6.

Figure 9 is a fragmentary exterior perspective view of one side of the casing.

Figure 10 is a fragmentary interior perspective view of the side of the casing shown in Figure 9.

Figure 11 is a cross section on the line XI—XI of Figure 6.

Figure 12 is a sectional view of the part of the rotor containing one of the reciprocatory pistons, the rotor being shown as composed of two members in separated relation.

Figure 13 are diagrammatic views to illustrate the respective positions of the intake, exhaust and back-pressure relief ports and passageways.

Figure 1:
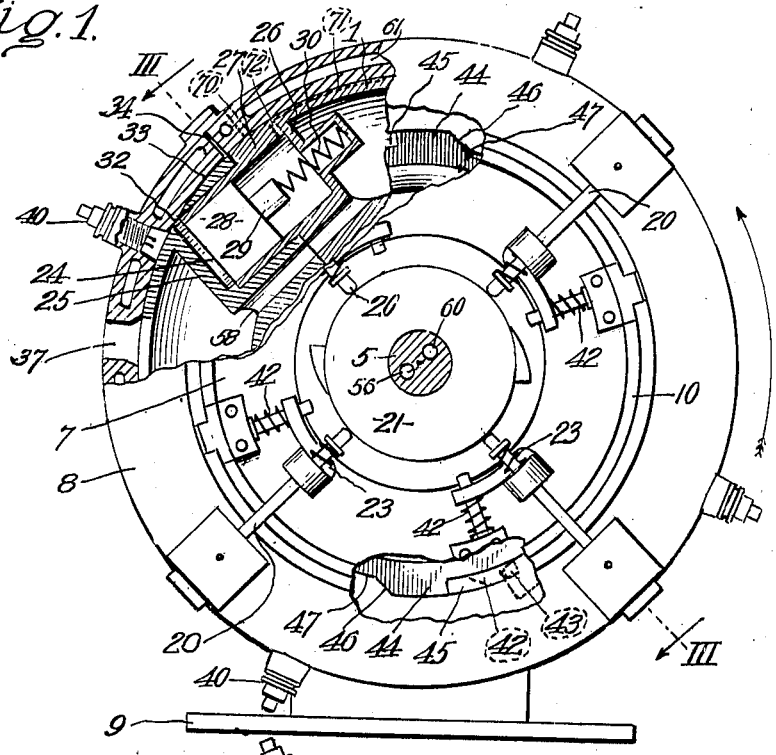
Figure 1 is a sectional view of a rotary internal combustion engine embodying the invention, the section being on the line I—I of Figure 3, with the casing broken away at two points to disclose a rotor in elevation at one point, and in section at the other point to disclose a section through a reciprocatory piston in gas-compression position.

Before proceeding with a detailed description of the engine, a brief synopsis of the novel construction and operation is desirable. The drawings disclose a circular or annular hollow rotor within an enclosing housing or casing, said rotor containing one or more reciprocating or floating pistons having no crank or connecting rods (two only being shown, at diametrically opposite points), together with an external compressor or supercharger for each of the gas intake ports. The explosive mix is fired in a chamber formed between the head of each reciprocating piston and a partition wall integral with the rotor. At the time of the explosion, the reciprocating pistons are interlocked with the engine casing so that the entire force of the explosion reacts against said rotor partition to drive the rotor. In the embodiment of the invention herein illustrated, eight explosions are produced per revolution of the engine shaft, there being four spark plugs carried by the casing, and two explosion chambers in the rotor so that the explosions occur in pairs at diametrically opposite points. However, for convenience, the invention will be described as if there were but one explosion per revolution which would be true if there were but one spark plug in the casing and one explosion chamber in the rotor. The size of the apparatus is the only limitation on the number of explosions per revolution for which it can be built. A type of compression means and a type of water circulation apparatus are shown and described, but these are chiefly for exemplification purposes, as equivalents may be substituted.

In the drawings, 1 is a rotor of tubular annular form, which is shown as comprising a pair of members provided with spokes or webs 2, secured together by bolts 3. The spokes terminate in a hub 4 which is keyed or otherwise non-rotatably secured to the engine shaft 5. The shaft 5 projects beyond the opposite sides of the rotor 1, and is journaled in suitable bearings 6 carried by a pair of casing closure plates or disks 7, provided with circular rims of semicircular cross section of proper size and curvature to just clear the inner lower half of the perimeter of the rotor 1, this clearance space being adapted to receive any suitable lubricant. The confinement of the rotor is completed by a pair of outer semi-circular casing members 8, corresponding in cross section to the curvature of the outer half of the rotor 1 and completing the lubricating chamber within which said rotor is journaled. The lower outer casing member 8 is mounted on any suitable base or engine support 9. The outer casing members 8 and the end closure plates or disks 7 are provided with abutting flanges 10 and bolts may be used to draw down the parts and secure the casing together in a unitary structure.

Figure 3:
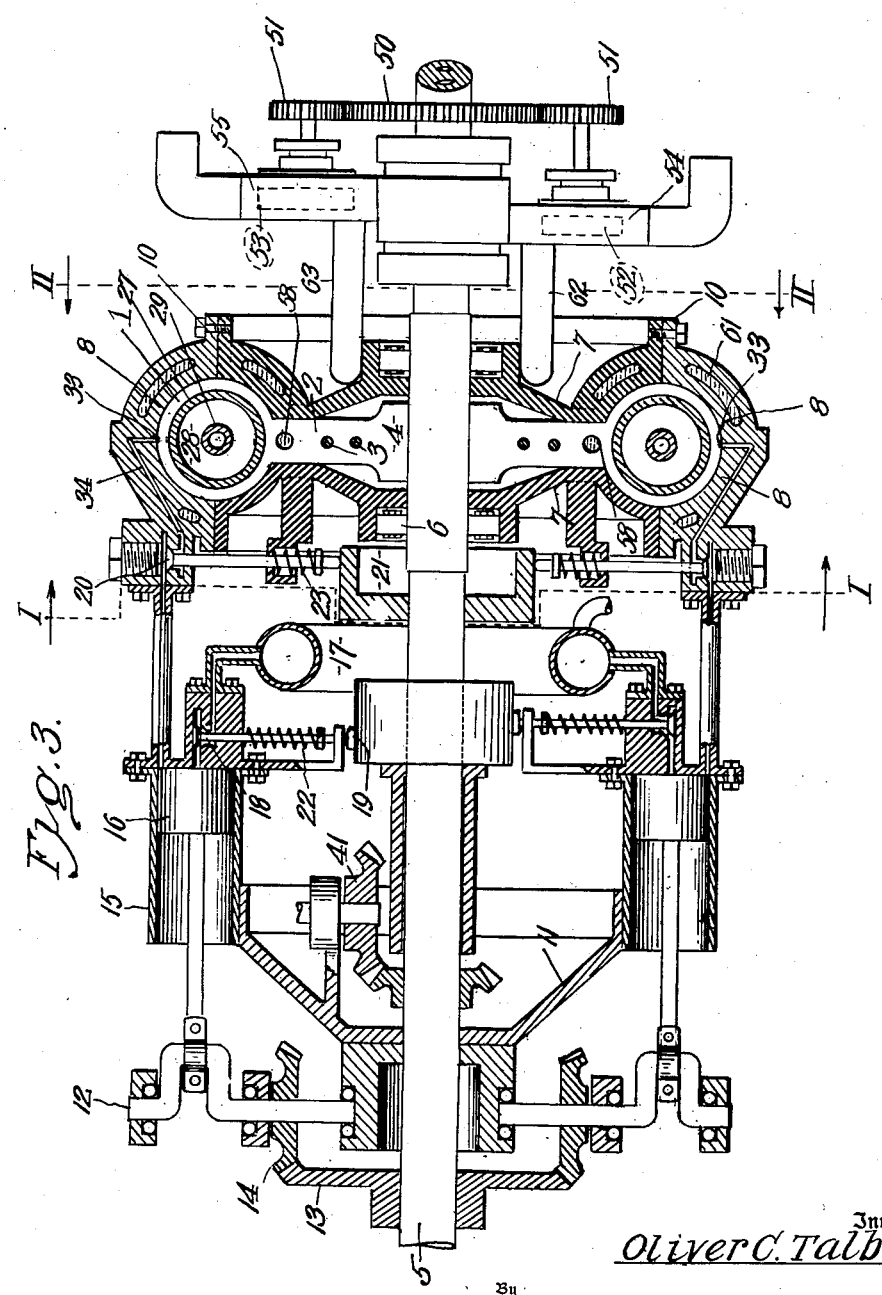
Figure 3 is a section on the line III—III of Figure 1, omitting the base support, but disclosing the explosive mixture supply and control equipment.
Figure 4:
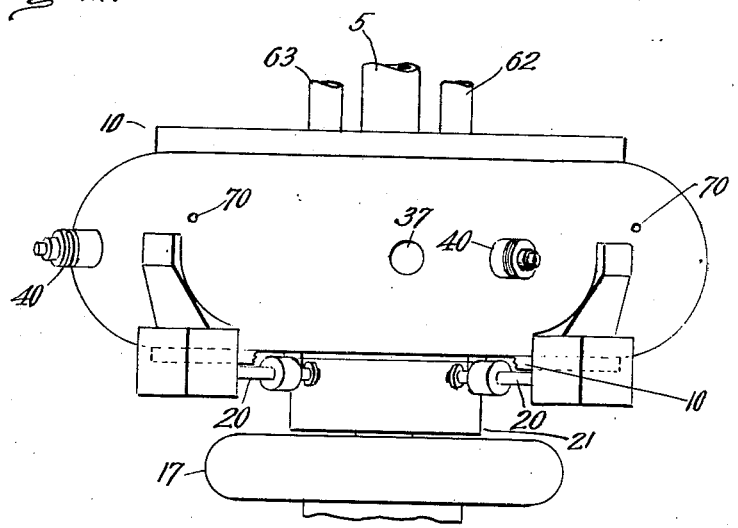
Figure 4 is a top plan view of the engine but omitting most of the explosive mixture supply equipment and the cooling medium circulating apparatus.

Inasmuch as the present invention involves charging the explosion chambers, hereinafter described, from an outside source of compressed explosive mixture, reference will now be had to the compressor so that the description of the parts and their operation, will follow along in proper sequence. Secured in any suitable manner in fixed relation to the engine casing, is a support 11 which provides a bearing for one end of a crank shaft 12, said crank shaft being driven by the engine shaft 5, through a pair of gears 13 and 14 (Figure 3), at twice the speed of the latter in the present embodiment of the invention. Carried by the support 11 is a compression cylinder 15 within which a piston 16 is adapted to reciprocate in timed relation to the rotation of the shaft 5. The piston 16 sucks in a charge of gas from an intake manifold 17 past a valve 18 which is opened by a cam 19 fixed to the engine shaft 5. On the compression stroke of the piston 16, the gas is compressed in cylinder 15, and at the proper time an engine inlet valve 20 is opened by a cam 21 on the engine shaft 5. Each of said valves 18 and 20 are reclosed by suitable springs 22 and 23 respectively (Figure 3).

The rotor 1 is peripherally provided with one or more (two being shown in the drawings), charge-receiving explosion chambers or cylinders 24. The explosion chambers or cylinders have their opposite ends respectively terminating in one section of the rotor, in a leading partition 25 (referring to the direction of rotation of the rotor), and a following partition 26 in the other section of said rotor. In order to bridge the joint between the rotor sections to better hold the explosion, the chamber may be reinforced by a cylindrical lining 27 produced by telescoping cylindrical connections between the partitions 25 and 26 (Figure 1). Floating within the explosion chamber is a reciprocating piston 28, formed at its rear or trailing end with a projecting stud 29 providing a thrust or resistance point for a spring 30 interposed between the same and the trailing partition 26. It is to be understood that the spring 30 assisted by a stop hereinafter identified, not only holds the reciprocating piston against the pressure of the compressed gas entering the intake port, but also advances the piston to scavenge or exhaust the explosion chamber 24.

Extending through the wall of the rotor 1 from the explosion chamber 24 is a port 32 which communicates with a peripheral groove 33 in the exterior surface of the rotor. At the time the valve 20 is opened by its cam 21, the leading end of the groove 33 communicates or registers with an intake port 34 in the casing (Figure 3), which opens into the manifold controlled by said valve 20. Gas is thus compressed in the chamber 24 between the head of the floating piston 28 and the leading partition 25.

As heretofore stated the spring 30 may be assisted in holding the piston 28 against the force of the compressed gas mix, by a friction stop 38 abutting the rear face of said piston (Figure 7). This stop member slides through an opening 39 in the side wall of the rotor 1, and normally it always abuts the rear end of the piston 28.

Assuming the rotor 1 continues its forward travel after compression of a change in the chamber 24, the groove 33 is of such length that just as communication is cut off between said groove and the intake port 34, the leading end of the groove registers with a spark or firing plug 40. Ignition at the plug is controlled in timed relation to the engine by any suitable timing mechanism (not shown), which may be driven by the gears 41 on the shaft 5.

Figure 2:
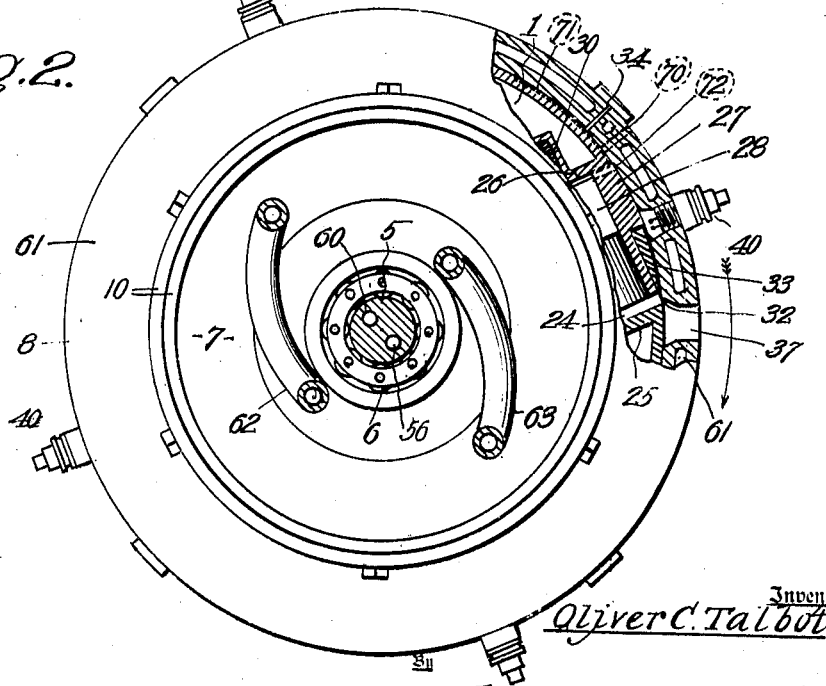
Figure 2 is a section on the line II—II of Figure 3 with the casing and rotor broken away to disclose the enclosed reciprocatory piston in position to start the expulsion of the dead gases.

It will be evident to avoid waste of power, means must be provided to prevent backward movement of the reciprocatory piston 28 so that the entire force of the explosion will be exerted against the leading partition 25 to drive the motor. Thus, to avoid waste of power, as nearly as possible concurrently with the explosion, depending on the flame propagation qualities of the fuel, a spring-advanced radial lock 42 carried by the casing, springs into position to abut a foot 43 formed integrally with the piston 28 so that the force of said explosion reacting against the head of piston 28 is used to repel or drive the rotor by force applied to the partition 25. This radially moving lock 42 projects into a space 44 in the rotor, said space being of sufficient length to permit the lock to remain in abutment with the foot or extension 43 on the piston 28, said foot 43 projecting through a slot 45 in the wall of the rotor, until the trailing partition 26 through compression of the spring 30 (Figure 2) fully tensions said spring to condition it to move the floating piston 28 forwardly to exhaust the gases as continued forward movement of the rotor brings the front or leading end of the groove 33 and the port 32 into register with an exhaust port 37 in the casing wall.

Also, when the explosive mixture has fully expanded a cam surface 46 at the end of the space 44 in the rotor contacts and represses the lock 42, and a dwell portion 47 on said rotor, holds the lock repressed until the firing chamber goes through another cycle and again registers with a spark plug. It will be noted by reference to Figures 7 through 10, that the piston lock element or elements 42, having radial play in the casing, is or are accommodated by the dwell recess provided in the adjacent side of the rotor to avoid interfering with the rotation thereof, the dwell being continuous around the rotor except where broken by the space or spaces 44, forming part or parts of the slot or slots 45. Concurrently with the time of the explosion, the friction stop 38 comes into register with a groove 48 in the wall of the casing (Figure 7), so that the force of the explosion as it drives the rotor, forces said stop 38 outwardly through pressure applied on the stop by the wedge relationship brought about between the back of the piston 28 and the edge of the slot 39.

After the explosion and expansion of the gases, the rotor continues its travel, the casing groove 48 accommodating the protruding end of the stop 38 until about the time the piston 28 is in its rearmost position within the firing chamber, at which time the front end of the piston groove 33 communicates with the exhaust port 37 as above mentioned. When this occurs, the spring 30 commences to expand and forces the piston 28 forwardly in its chamber 24 to exhaust the products of combustion through port 32, groove 33 and port 37. Just at the time the spring 30 has fully advanced the piston 28, the end of the stop 38 contacts a cam face 49 (Figure 7), at the front end of the groove 48 in the wall of the casing, and said cam face drives the stop 38 inwardly to again abut the rear end of the piston 28 to hold the same to reinforce the spring 30 against another gas compression stroke.

In the drawings, a pair of firing or reciprocatory pistons 28 are shown, and the casing is formed with four firing points, as heretofore mentioned, each point involving intake, firing and exhaust. It is to be understood that these parts may be multiplied, preferably in pairs to maintain balance, within the available limits of the peripheries of the rotor and its casing. With the construction shown, simultaneous firing occurs in diametrically opposite quadrants, and the parts are so timed.

It is to be understood that as common with all reciprocating piston type of internal combustion engines, the rear or back side of the piston 28 must communicate with the atmosphere to prevent trapping of air and back-pressure. Therefore, the casing 8 adjacent each of the firing points and offset in relation to the alined relation of the spark plugs and intake and exhaust ports, is provided with a port 70 communicating with the atmosphere. The external periphery of the rotor, offset in relation to its groove 33, is provided with a longitudinally extending groove or passageway 71 communicating at one end by means of a port 72 with the space between the back of the reciprocating piston 28 and the trailing partition 26 of the rotor 1. Just prior to the firing of the charge the groove 71 and port 72 come into registering relation with the relief port 70. As the rotor continues its forward travel as heretofore described, said groove 71 maintains communication between ports 70 and 72 through the entire cycle of firing and exhaust strokes of the piston 28 to prevent either a pressure or vacuous condition behind said piston, as will be readily understood.

Figure 5:
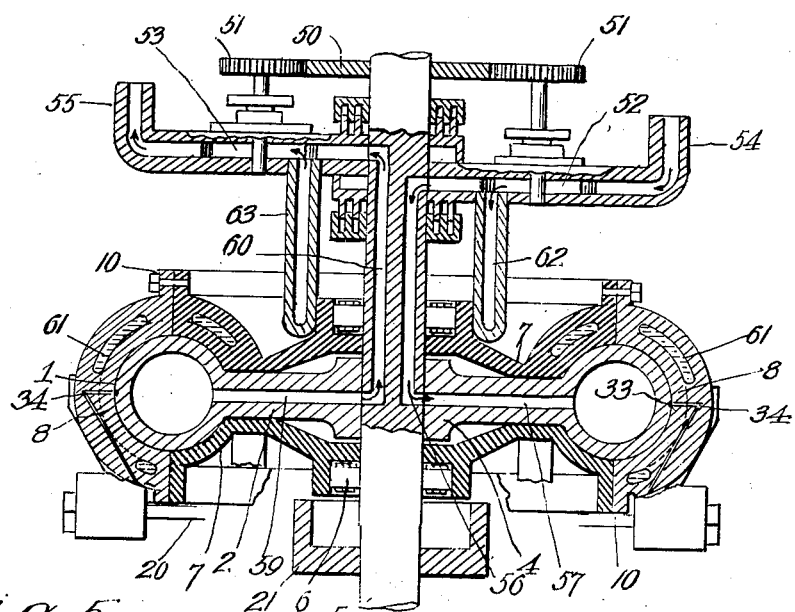
Figure 5 is a diametric section of the casing and rotor and includes a sectional view of the cooling medium equipment, the view showing the rotor at a different period of its rotation to disclose cooling medium passages leading to and from the interior of said rotor.

In order to effectively cool the engine, the casing is formed with a liquid circulating cooling jacket, and means are also provided to pass cooling liquid through the body of the hollow rotor. To accomplish a forced circulation of the cooling liquid, the engine shaft 5 carries a gear 50 which meshes with a pair of gears 51 respectively driving a pair of water pumps 52 and 53 (Figure 5). The water pumps are mounted within an annular intake and exhaust manifold 54 and 55 respectively. The shaft 5 is bored to provide an intake passageway 56 communicating with the intake manifold 54, and said intake passageway communicates with an intake passageway 57 in one of the spokes of the rotor 1. Cooling liquid is thus circulated through the rotor, the partitions 25 and 26 (Figures 1 and 12) being provided with openings 58 (Figures 1, 3 and 12) for the free circulation thereof. The spoke diametrically opposite the intake spoke 57 is also provided with a passageway 59 for the exhaust of liquid through an exhaust passageway 60 in the shaft 5, which in turn communicates with the exhaust manifold 55 in which the pump 53 is mounted. The outer casing members 8 are double walled to provide a cooling passage 61 (Figures 1, 2, 3 and 5), forming a cooling jacket. The jacket 61 is connected by a curved pipe 62 to the water inlet manifold 54, and diametrically opposite said inlet pipe 62 is an outlet pipe 63 connected to the outlet manifold 55.

From the above description and drawings, it will be apparent that I have produced a construction embodying the features set forth as desirable in the statement of the objects of the invention, and while I have presented the most approved type of the engine, I reserve the right to make such changes as properly fall within the spirit and scope of the appended claims.

I claim:

1. In a rotary internal combustion engine, a fixed annular casing, a rotor rotatably mounted in the casing and having an internal explosion chamber formed with a slot through its wall, a piston within said chamber having an extension projecting through said slot, a recess of determined length in the external wall of the rotor receiving the end of said extension, a spring-advanced lock carried by the casing for projection into the recess for abutment with the extension, a cam surface and dwell on the rotor to repress and hold said lock against its spring tension, means to compress gas within the chamber, means to hold the piston against such gas pressure and to return it to original position to evacuate the explosion chamber.

2. In a rotary internal combustion engine, a fixed annular casing, a rotor rotatably mounted in the casing and having an internal explosion chamber formed with a slot through its wall, a piston within said chamber having an extension projecting through said slot, a recess of determined length in the external wall of the rotor receiving the end of said extension, a spring-advanced lock carried by the casing for projection into the recess for abutment with the extension, a cam surface and dwell on the rotor to repress and hold said lock against its spring tension, means to compress gas within the chamber, and spring means to hold the piston against such gas pressure and to return it to original position to evacuate the explosion chamber.

3. In a rotary internal combustion engine, a stationary casing having a hollow peripheral circular chamber circular in cross section, containing gas inlet and exhaust ports and a spark plug between them, a rotor fitting snugly within the said circular chamber, having fixed spaced cross partitions providing an interposed combustion chamber, a reciprocatory piston within the combustion chamber, the wall of the casing having an inner groove extending circumferentially, a radially slidable friction stop carried by the rotor to alternately protrude into the combustion chamber and said casing groove, said stop occupying the first-named position when an explosion is produced in the combustion chamber to assist in preventing backward movement of the piston, and occupying the other position, when under the rotor advance, the stop is pressed against the rear end of and is forced outward by the piston the outer end of the stop as it is advanced by the rotor beyond the front end of the piston, encountering the front end wall of the said groove and being caused by said wall to again protrude into the combustion chamber at the rear end of the piston, and yielding means for advancing the piston relative to the combustion chamber to either compress an explosive mixture against the leading cross partition or drive out burned gases, to permit said front wall of said groove to offer resistance to the advance movement of the friction stop and cause the latter to again protrude into the combustion chamber back of the piston.

4. In a rotary internal combustion engine, a rotor having a hollow circular peripheral portion circular in internal cross section, and provided with a slot in its side wall, an external circumferential recess extending rearwardly from said slot, a cam at the rear end of the recess and a circular dwell or channel struck from the axis of the rotor and opening at its ends into opposite ends of said recess and slot.

5. In a rotary internal combustion engine, a rotor having a hollow circular peripheral portion circular in internal cross section, provided with fixed spaced cross partitions providing an interposed combustion chamber, a passage communicating with the front end of said chamber, and provided with an exhaust opening forward of the leading partition, the wall of the rotor having a radial opening and a slot in communication with the combustion chamber, the wall also having a recess registering with said slot, a cam at the rear end of the recess, and a circumferential dwell or channel opening at its opposite ends into said recess and said slot, a reciprocatory piston in the combustion chamber provided with a foot projecting through said slot and into said recess, a spring for moving the piston forward, means to lock the piston in its forward position, and a friction stop for protruding through the motor wall opening rearward of the piston to assist in holding the same against back movement.

6. In an internal combustion engine of the rotary type, a stationary casing having a hollow circular peripheral portion and a central portion providing a chamber, a shaft extending through the axial center of the central portion and bearing a journaled relation thereto, the peripheral portion having a gas passage, an exhaust opening and a spark plug between said gas passage and exhaust opening, a rotor comprising a central portion secured on the shaft within the said casing chamber, and an outer hollow circular peripheral portion fitting snugly within the peripheral portion of the casing, the outer portion of the rotor having fixed spaced cross partitions forming an interposed combustion chamber provided with a wall opening for communication once in each revolution of the rotor with said casing gas passage, spark plug and exhaust opening of the casing, a reciprocatory piston in said combustion chamber, yielding means for advancing the piston when unopposed, a valve normally closing said gas passage, a cam on the shaft for unseating said valve as the combustion chamber wall opening registers with the gas passage of the casing, a spring for reseating said valve as the rotor passes its said wall opening out of communication with said gas passage, a gas manifold, a cylinder connected thereto, a piston in the cylinder, means operable by the shaft to reciprocate said piston, a normally seated valve in the connection between the manifold and said cylinder, a cam operable by the shaft for unseating said valve upon one stroke of said piston, means for reclosing said valve upon the other stroke of the piston concurrently with the opening of the gas passage valve, to supply the combustion chamber with gas under pressure forward of the piston.

7. In a rotary internal combustion engine, a rotor having a hollow circular peripheral portion circular in cross section, and composed of arcuate sections secured together in endwise abutting relation, the adjacent ends of the sections each having a cross partition spaced apart to provide an interposed combustion chamber, one of the sections having an extension fitting telescopically within the other section.

8. In a rotary internal combustion engine, a stationary casing including a hollow circular peripheral portion circular in cross section and provided with an intake gas passage, a spark plug and an exhaust opening; a rotor within the peripheral portion of the casing, provided with fixed spaced cross partitions forming an interposed combustion chamber having a port at its front end for alternately receiving fresh gas and discharging burnt gases, and for successive registration with the casing intake gas passage, the spark plug and exhaust opening; a reciprocatory piston in the combustion chamber, having a foot portion projecting laterally; the rotor having a circumferential wall slot receiving said piston foot, a recess conforming to and outward of and registering with said slot and receiving the outer end of said foot, a cam at the rear end of said recess, and a circumferential dwell inward of the cam and communicating at its opposite ends with the opposite ends of said recess; a locking element projecting through a wall of the casing, a spring for advancing said element into the orbit of travel of the piston foot and cam and into said recess between the piston foot and cam for repression by the latter until its outer end lies in said dwell, after the force of an explosion in the combustion chamber has accelerated the movement of the latter relative to the piston, and a spring in the combustion chamber to cooperate with the locking element in holding the piston when advanced, against repression when an explosion occurs, and, after the rotor movement has been accelerated relative to the piston, to advance the latter to scavenge the combustion chamber of dead gases.

OLIVER COE TALBOT.